United States Patent
Jensen

(10) Patent No.: US 6,607,020 B1
(45) Date of Patent: Aug. 19, 2003

(54) SCREENING ARRANGEMENT AND METHOD FOR INSTALLATION OF SUCH IN A CURB FOR A SKYLIGHT

(75) Inventor: Jimmy Skjold Jensen, Skjern (DK)

(73) Assignee: VKR Holding A/S, Søborg (DK)

( * ) Notice: Subject to any disclaimer, the term of this patent is extended or adjusted under 35 U.S.C. 154(b) by 21 days.

(21) Appl. No.: 09/702,710

(22) Filed: Nov. 1, 2000

(51) Int. Cl.[7] .................................................. E06B 3/48
(52) U.S. Cl. .......................... 160/84.06; 160/172 R; 52/200; 52/656.9; 403/382; 403/403
(58) Field of Search ...................... 160/84.04, 84.05, 160/90, 84.06, 107, 172 R; 52/200, 72, 656.5, 656.9; 403/382, 403

(56) References Cited

U.S. PATENT DOCUMENTS

| | | | |
|---|---|---|---|
| 1,919,780 A | * | 7/1933 | Fairbank |
| 3,353,854 A | * | 11/1967 | Hansen |
| 3,494,647 A | * | 2/1970 | Farley |
| 4,647,488 A | * | 3/1987 | Schnebly et al. |
| 4,665,964 A | * | 5/1987 | Zommers |
| 4,762,160 A | | 8/1988 | Bechtold et al. |
| 4,917,167 A | * | 4/1990 | Voss et al. |
| 5,088,543 A | * | 2/1992 | Bilbrey |
| 5,195,569 A | * | 3/1993 | Peterson et al. |
| 5,544,455 A | * | 8/1996 | DeBlock |
| 5,671,790 A | * | 9/1997 | Andersen et al. |
| 5,913,785 A | * | 6/1999 | Moller et al. |
| 5,924,259 A | * | 7/1999 | Marousek |
| 6,179,515 B1 | * | 1/2001 | Grieser et al. |
| 6,206,076 B1 | * | 3/2001 | Stawski |

* cited by examiner

Primary Examiner—Blair M. Johnson
(74) Attorney, Agent, or Firm—Venable; John P. Shannon; Chad C. Anderson

(57) ABSTRACT

A screening arrangement for installation in a curb for a skylight in a roof structure comprises four rails for mounting on an internal surface of the curb to form a frame in the curb. The rails comprise at least one supporting rail associated with a collapsible screen of which a first end is fixed in relation to said rail and a second end is free. Four corner brackets are provided for mounting at respective corners of the curb, each said bracket having an abutment surface for abutment on the top edge of the curb and a support member for supporting two of said rails.

14 Claims, 5 Drawing Sheets

SCREENING ARRANGEMENT AND METHOD FOR INSTALLATION OF SUCH IN A CURB FOR A SKYLIGHT

BACKGROUND OF THE INVENTION

The present invention relates to a screening arrangement for installation in a curb for a skylight in a roof structure.

In order to install a skylight in a roof structure a curb frame is usually fabricated on the site to match an opening cut through the external roof covering and underlying plate members of the roof structure. The curb is composed of four wall members which may be joined together to form a rectangular frame. The curb frame is then positioned on and secured to rim portions of the roof plate members surrounding the opening. Subsequently the curb is usually lined on the internal side of its wall members by suitable panel members, such as plasterboards, forming a shaft extending through the curb as well as the underlying roof structure and insulation.

As the curb in each case is handmade according dimensions of the actual roof structure, the internal dimensions of the curb will be different in each case. Furthermore, in case of a less accurate cutting of the roof opening, frequently parts of the roof plate members may project into the opening at the lower end of the curb, and consequently an individual adaption of the lining members becomes necessary. The need for individual adaption of the lining members forming the internal surface of the curb will frequently reduce the space available for mounting a screening arrangement in the form of a venetian blind, a roller blind or a pleated blind. As a consequence of these conditions the dimensions of standard designs of screening arrangements will usually not fit into the available space.

U.S. Pat. No. 4,762,160 to Bechtold et al. discloses a screening arrangement comprising four rails to be mounted on the internal vertically extending surface of a curb in a roof structure. The rails comprise a top rail carrying a rolled up shade, two side rails guiding the shade when it is unrolled, and a bottom rail. In order to position the rails correctly in the curb, first the appropriate distance from the top edge of the curb must be measured out separately for each rail on the internal surface at the respective wall member of the curb. Subsequently, the rails must one by one be positioned on the internal surface according to the measurement and retained by hand in the position during the fixation of the rail to the curb by means of screws. Obviously, this cumbersome manual mounting procedure is a disadvantage as it is time consuming and consequently costly.

Furthermore, in most cases a standard set of rails will not fit into the curb lining for the reasons discussed above. Consequently, either the screening arrangement must be ordered made to measure or it must be individually adapted on the site to fit the internal surface of the curb formed by the lining. If the screening arrangement is ordered to measure, this results in a considerably higher cost price and an interruption of the installation work, because the screening arrangement cannot be ordered before completion of the individually adapted lining of the curb frame. On the other hand, if the screening arrangement has to be individually adapted on the site, this involves time consuming manual work which is also costly. Furthermore, the rails of the screening arrangement and the axle with the rolled up shade must then be specially designed in order to allow for the manual adaption.

BRIEF SUMMARY OF THE INVENTION

In view of the foregoing, it is an object of the present invention to provide a screening arrangement which permits correct installation in a curb without having to carry out difficult measurements.

It is another object of the invention to provide a screening arrangement which is easier to install than the known arrangements.

A further object is to provide a screening arrangement which will fit into an individually adapted curb without being fabricated to measure or needing cumbersome adaption on the site.

In summary, a screening arrangement for installation in a curb for a skylight in a roof structure is provided. The curb is of the type having four wall members joined together to form a substantially rectangular frame having four corners, and the curb has a top edge and an internal surface facing the inside of the frame. The screening arrangement is of the type comprising four rails being adapted to be mounted on the internal surface of said curb to form a frame in the curb. At least one of the rails is associated with a collapsible screen of which a first end is fixed in relation to said rail and a second end is free. Four corner brackets are provided for mounting at respective corners of the curb, each said bracket having an abutment surface for abutment on the top edge of the curb and a support member for supporting two of said rails.

During installation of the screening arrangement in the curb, first the four corner brackets are placed at respective corners of the curb in such a way that the abutment surface of each bracket abuts on the top edge of the curb. The brackets may then be secured to the curb by means of fasteners, such as screws, nails or the like. Subsequently, each rail is first positioned between two respective corner brackets so that either end of the rail is supported by the supporting member of a corner bracket, and then the rail is secured to the curb by means of fasteners. In this way, no measuring is necessary in order to position the rails correctly in relation to the top edge of the curb, because the corner brackets provide the correct position of the rails in relation to the top edge of the curb. As the rails during their fixation to the internal surface of the curb are supported by the corner brackets, it is not necessary to handhold the rails during fixation and therefore an easier and at the same time more precise positioning is possible. Furthermore, the support member of a corner bracket may be in the form of a plate member adapted to cover the possible gap between the rails at a corner so that this gap is invisible from the inside of the room in which the screening arrangement is installed.

Consequently, a given set of rails each having a standardized length may be utilized for a range of different internal dimensions of a curb, these different dimensions resulting from individual adaption of the curb and its lining. The rails in conjunction with the corner brackets will appear as forming a continuous frame which in the unrolled state of the screen may completely surround the latter in a light-sealed manner. In this way one standard size of screening arrangement will fit different sizes of curb without cumbersome adapting procedures and without any visible adjustments.

BRIEF DESCRIPTION OF THE SEVERAL VIEWS OF THE DRAWINGS

Examples of the invention will now be explained below with reference to the very schematical drawings, in which.

DETAILED DESCRIPTION OF THE INVENTION

Figure 1:
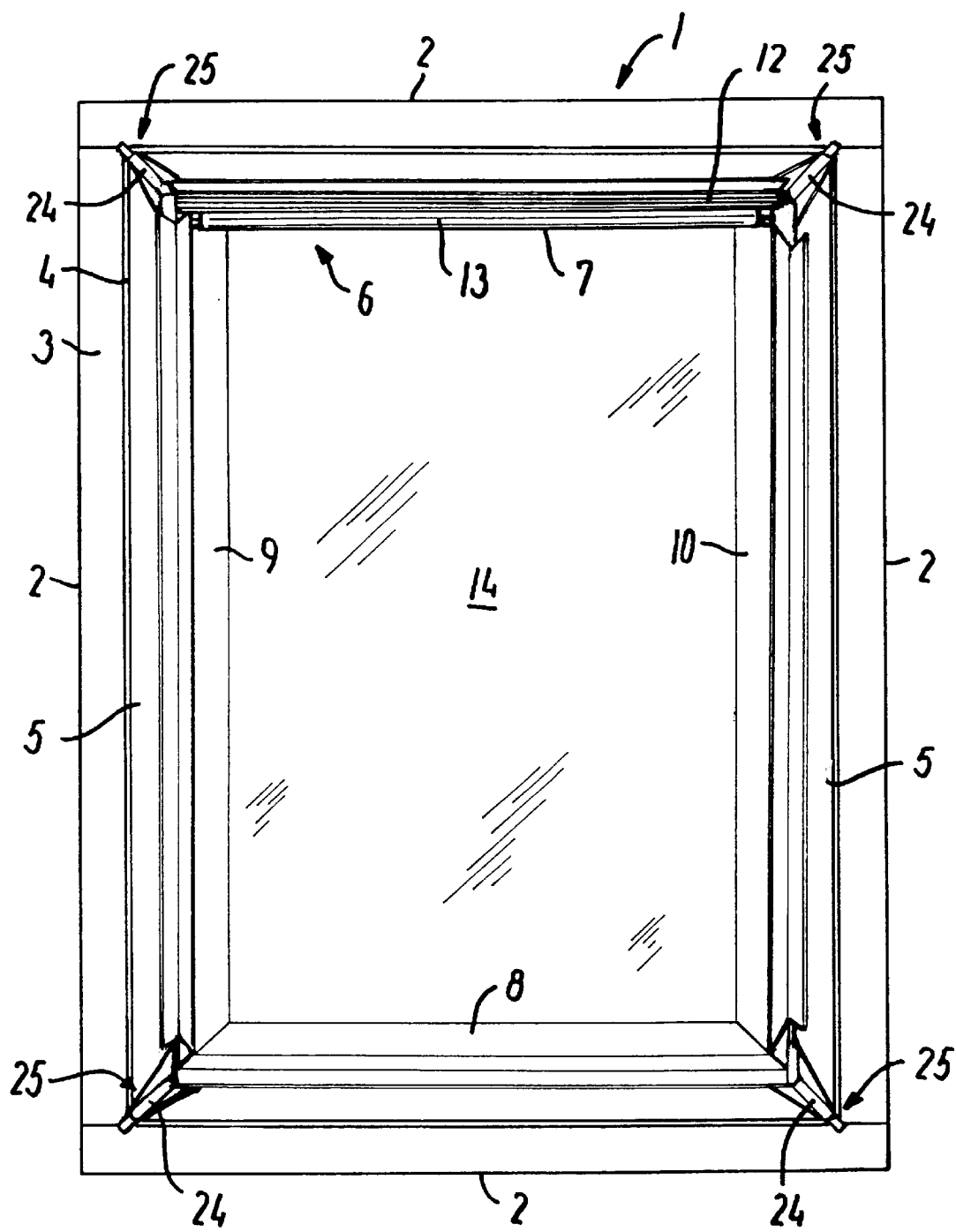
FIG. 1 is a top view of a curb with installed screening arrangement according to the invention, the screen being in open position.

FIG. 1 shows a curb frame 1 for a skylight to be mounted on the upper side of a roof structure (not shown). The roof structure may be of the kind comprising plywood plate members secured to the rafters of the structure. It is customary practice prior to the installation to cut a hole or an opening through the plate members and the external roof covering secured thereto in order to localize the rafters and avoid damaging when the greater final opening for the window is cut.

After cutting the window opening the curb frame 1 is fabricated on the site to match the window opening and it is mounted and secured to the roof structure. The curb frame 1 is normally, as shown in the example, of a rectangular form and is composed of four wall members 3, such as boards, having top edges 3 forming engagement surfaces for part of the window frame structure (not shown). Each curb wall member 2 is positioned on and secured to a roof plate member along a rim part of the roof plate defining the roof opening which has been cut for the installation of the skylight, normally in alignment with a pair of rafters forming part of the underlying roof plates. The curb frame 1 is lined on the internal side of the wall members 2 by panel members in the form of plaster boards 4 forming an internal surface 5 of the curb 1 and a shaft extending through the curb frame 1 as well as the underlying roof structure and insulation.

A screening arrangement 6 comprises four rails, namely a top rail 7, a bottom rail 8 and two side rails 9, 10. In the installed condition of the screening arrangement 6 in the curb 1 shown in FIGS. 1 and 2, the rails 7, 8, 9, 10 form a frame extending along the internal surface 5 of the curb 1 and forming an opening 14. Each rail has a basically L-shaped cross section, a first leg of the L forming a flange 19 abutting the internal surface 5 of the curb 1 and being attached to the curb 1 by means of screws 20 inserted through holes in the flange 19, and a second leg 23 of the L extending parallel to a plane through the frame formed by the rails 7, 8, 9, 10.

Figure 2:
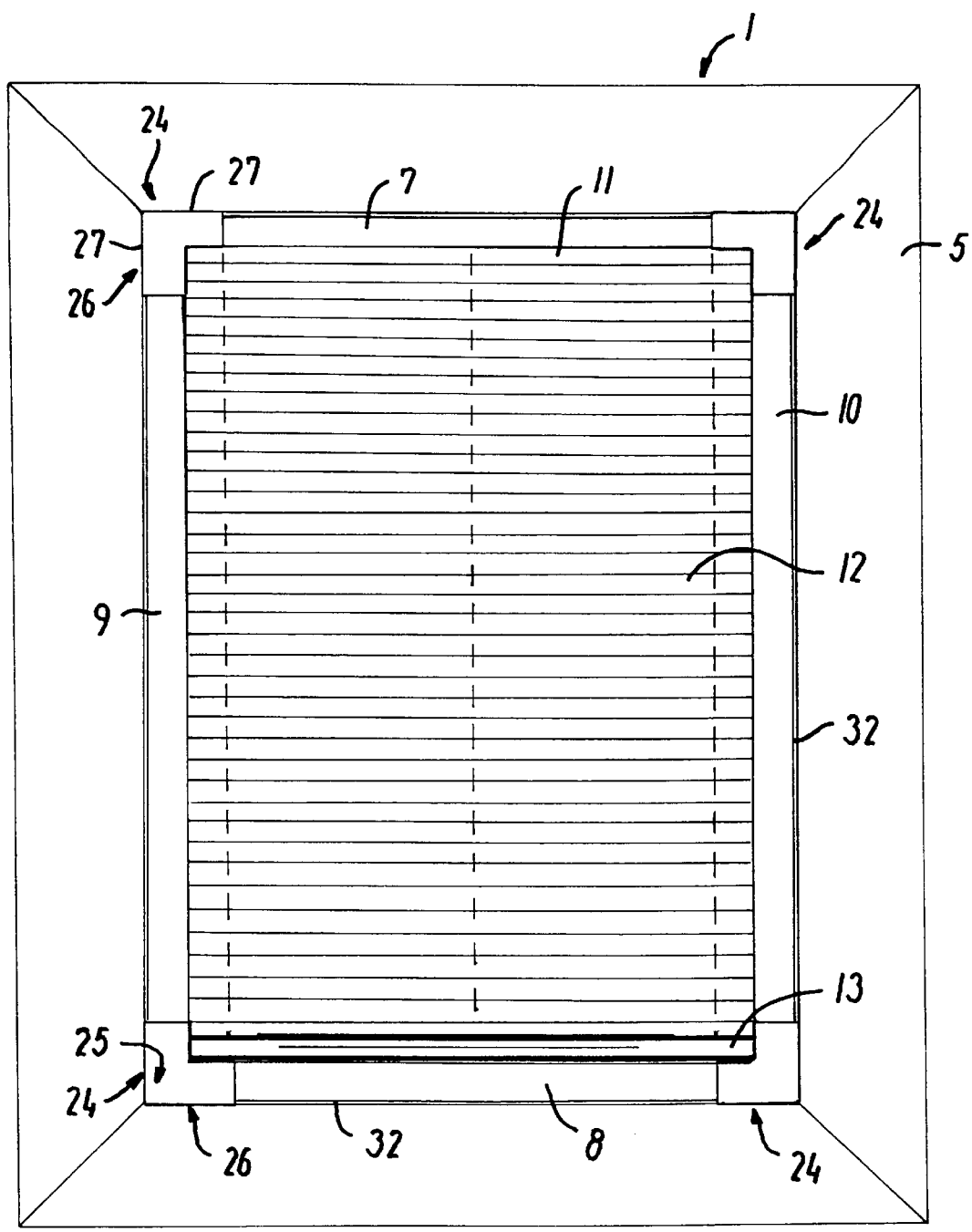
FIG. 2 is a bottom view of the curb in FIG. 1, the screen being in closed position.
Figure 4:
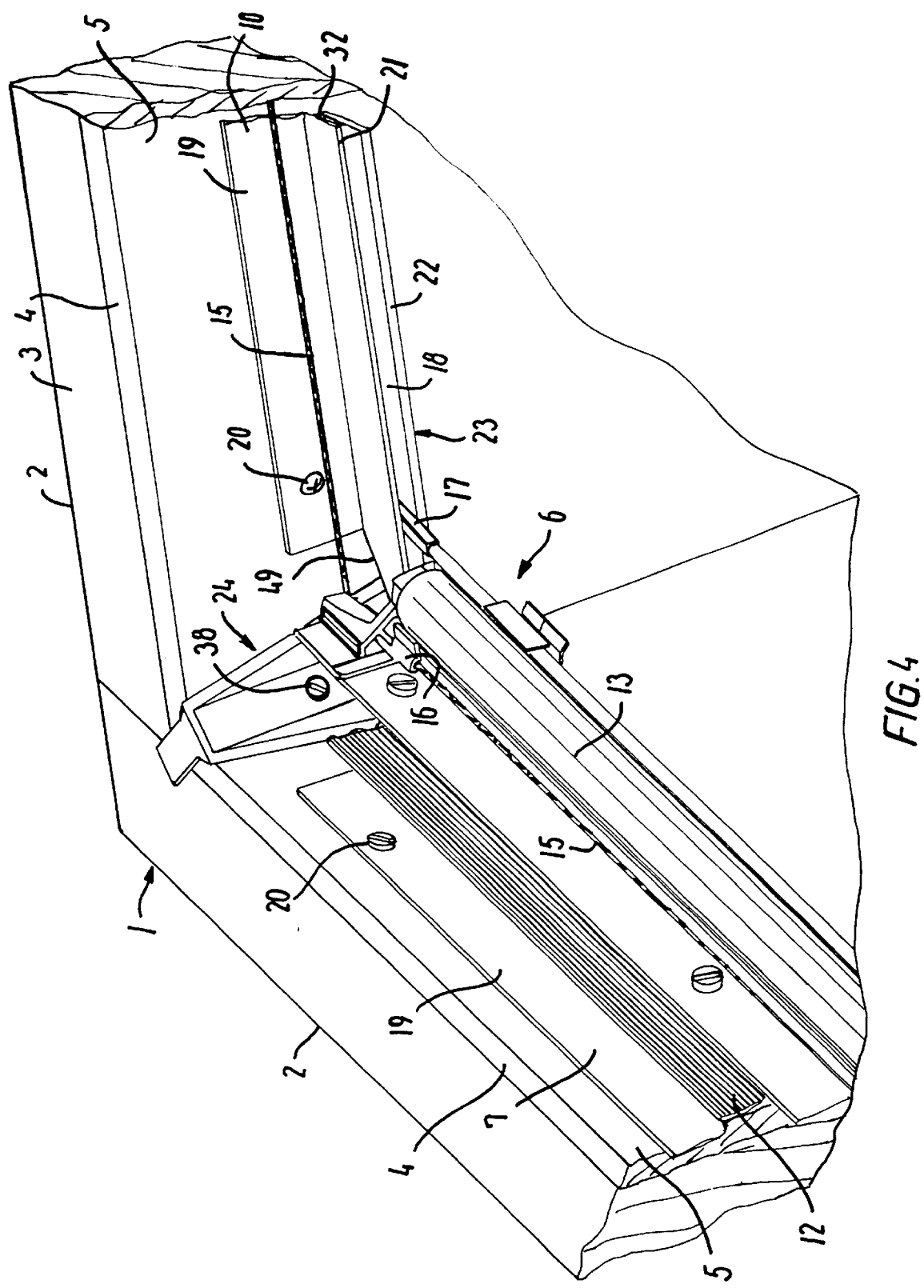
FIG. 4 is a perspective view of a top corner of the screening arrangement in FIG. 1.

The top rail 7 is connected to a fixed end 11 of a collapsible screen in the form of a pleated blind 12 known per se which in its collapsed condition is taken up in the top rail 7 as shown in FIG. 1 and FIG. 4 (in FIG. 4 part of the pleated blind 12 has been cut away to show the corner bracket 24). A free end of the pleated blind 12 is connected to an end bar 13 which can be moved by hand to be parallel displaced whereby the pleated blind 12 may be brought from the collapsed condition shown in FIG. 1 to an extended condition in which the blind 12 covers the entire opening 14 through the frame formed by the rails 7, 8, 9, 10, as shown in FIG. 2.

At the displacement of the end bar 13, tips 17 of the end bar 13 are guided in channels 18 formed between two parallel walls 21, 22 of the second leg 23 of the L-shaped side rails 9, 10 and the end bar 13 is guided to be parallel displaced by means of an arrangement of two cords 15 known per se, each end of the cord 15 being fixed to one of two opposite corners of the frame formed by the rails 7, 8, 9, 10, and the cord being guided along the end bar 13 by means of two guide members 16 being traversed by the cord and mounted at either end of the end bar 13, see FIG. 4.

Other types of screening arrangement than a pleated blind may be utilized, for instance a venetian blind or a roller blind. In case of the shown pleated blind, the longitudinal edges of the blind may be supported on the upper surface of the leg 23 of the side rails 9, 10, but for instance in case of a roller blind, the edges of the blind may be guided in the channel 18 formed in the leg 23.

The screening arrangement 6 is usually delivered to the customer as a set comprising the top rail 7 with attached screen 12 or with the screen separately, but adapted to be fitted on the top rail 7; the bottom rail 8; and the side rails 9, 10; as well as the screws 20 for mounting the rails to the curb 1. Furthermore, the screening arrangement 6 according to the present invention comprises four corner brackets 24 to be mounted at respective corners 25 of the curb 1 before the installation of the remaining parts of the screening arrangement 6.

Figure 3:
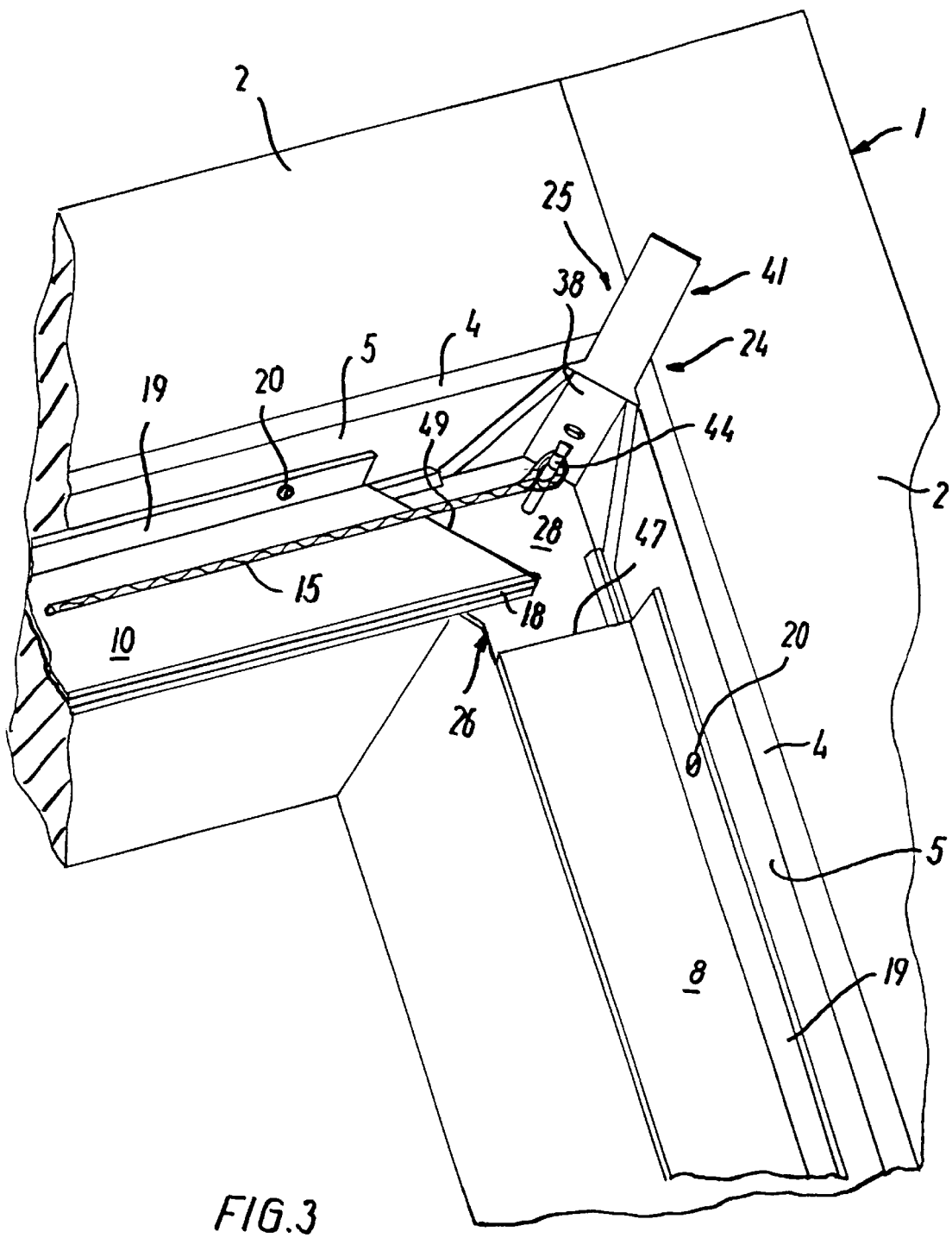
FIG. 3 is a perspective view of a bottom corner of the screening arrangement in FIG. 1.
Figure 5:
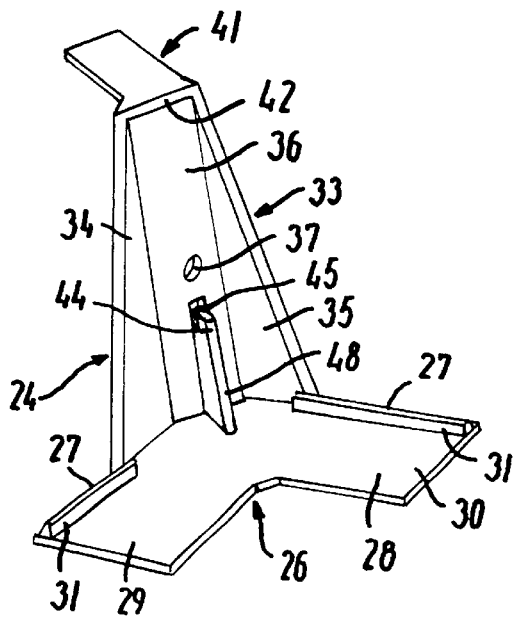
FIG. 5 is a perspective view of a corner bracket of the screening arrangement in FIG. 1.
Figure 6:
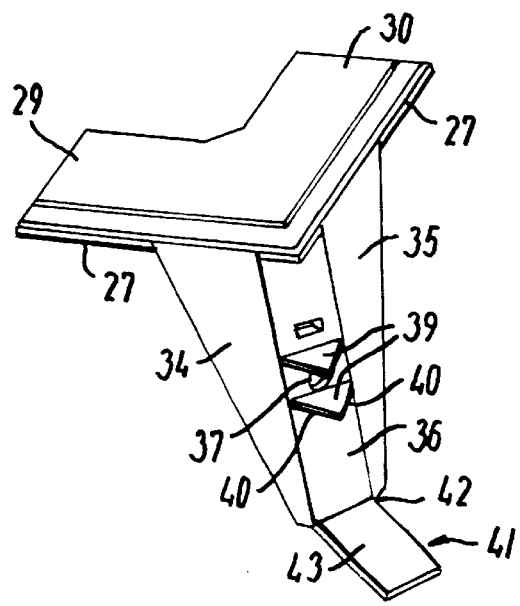
FIG. 6 is a perspective view showing the corner bracket in FIG. 5 turned upside down.

FIG. 5 shows a corner bracket 24 according to the invention. The corner bracket 24 comprises an L-shaped flat bottom plate 26 having two edges 27 at right angles to each other, intended for abutting the two perpendicular parts of the internal surface 5 of the curb 1 at each side of a corner 25, as best illustrated in FIGS. 2 and 3. The upper side 28 of the L-shaped bottom plate 26 is adapted to abut the downward side of the second leg 23 of two of said rails in such a way that an end of each rail abuts one of two legs 29, 30 of the L of the bottom plate 26.

Furthermore, the upper side 28 of the bottom plate 26 is provided with two ribs 31, each extending next to and along a respective edge 27 of the bottom plate 26 and being adapted to engage a notch 32 formed in the downward side of the second leg 23 of the rails 7, 8, 9, 10 and extending next to and along the first leg 19 of the rails. By engagement of the ribs 31 and the notches 32 the rails 7, 8, 9, 10 are guided in relation to the corner bracket 24 and thereby a more secure positioning of the rails is obtained.

The corner bracket 24 is further provided with a corner flange 33 standing up from the bottom plate 26 and having three wall sections 34, 35, 36 being perpendicular to the bottom plate 26. Two 34, 35 of these wall sections follow either one of the edges 27 of the bottom plate 26 and are interconnected by the third wall section 36 which forms an angle of 45° with said edges 27 of the bottom plate 26. The perpendicular wall sections 34, 35 are intended to abut the internal surface 5 of the curb 1 as are the edges 27 of the bottom plate 26. In order to reinforce the corner bracket 24 the perpendicular wall sections 34, 35 are wider at their lower end, where they connect to the bottom plate 26, and are tapered in upward direction in order to save material.

The third wall section 36 of the corner flange 33 is traversed by a mounting hole 37 intended for insertion of a mounting screw 38 for securing the corner bracket 24 to the curb 1. The mounting hole 37 is positioned approximately halfway up the flange 33, and just above and below the hole 37 the third wall section 36 is provided with a triangular stiffening rib 39 projecting parallel to the bottom plate 26 from the side of the third wall section 36 facing away from the two perpendicular wall sections 34, 35. Each stiffening rib 39 has two free edges 40 following said edges 27 of the bottom plate and being intended to abut the internal surface 5 of the curb 1 when fastening the screw 38.

As a result of the angular orientation of the third wall section 36 in relation to the perpendicular wall sections 34, 35, the corner bracket 24 may be fixed securely to the curb 1 by means of one screw 38 only, because the screw 38 can be screwed into the corner 25 of the curb in diagonal direction of the latter and nevertheless be well supported at its head by the third wall section 36, thereby drawing the corner bracket 24 against the corner 25 and pressing the perpendicular wall sections 34, 35 against the internal side 5 of the curb.

On the side opposite the stiffening ribs 39 the third wall section 36 is further provided with a hook 44 positioned just under the mounting hole 37 for attachment of the cord 15 of the screening arrangement 6. The hook 44 projects from an upper end of a rib 48 projecting from the third wall section 36 and having a lower end connected to the upper side 28 of the bottom plate 26. A tip 45 of the hook 44 points in the direction of a hole 46 through the third wall section 36, the hole 46 providing space for the cord 15 to be attached to the hook.

The corner bracket 24 is further provided a flap 41 projecting parallel to said bottom plate 26 from a top edge 42 of said corner flange 33 and being intended to abut the top edge 3 of the curb 1 with a lower side 43.

To install the screening arrangement 6 according to the invention, first a corner bracket 24 is mounted in each corner 25 of the curb 1. The corner bracket 24 is thereby positioned so that the lower surface 43 of the flap 41 abuts the top edge 3 of the curb 1 and the perpendicular wall sections 34, 35 abut the internal surface 5 of the curb 1 on either side of the corner 25. Subsequently the corner bracket 24 is secured to the curb 1 by means of the screw 38, as illustrated in FIGS. 3 and 4. After mounting all four corner brackets, the four rails 7, 8, 9, 10 are positioned and secured to the curb one by one.

Each rail is positioned so that its flange 19 abuts the internal surface 5 of the curb at the respective curb wall member 2 and so that the lower side of its second leg 23 is supported by the upper side 28 of the bottom plate 26 of the corner bracket 24 and the rib 31 of the corner bracket engages the notch 32 in the rail. Furthermore, the rail is positioned approximately at a middle position between the respective corner brackets so that each end of the rail overlaps the respective corner bracket 24 with substantially equal length. In this position, the rail is easily secured to the curb by means of the screws 20 without needing to handhold the rail. The rails 7, 8, 9, 10 are thus easily positioned without having to measure the distance between each rail and the top edge 3 of the curb 1 because this distance is given by the fixed height between the flap 41 and the bottom plate 26 of the corner bracket 24.

Furthermore, as is best illustrated in FIGS. 2 and 3, the bottom plate 26 of the corner bracket 24 covers the gap at the corner 25 of the curb 1 between the ends of the rails of the screening arrangement 6 so that the rails 7, 8, 9, 10 appear as a continuous rectangular frame from below the screening arrangement 6, i.e. from the room in which the curb with skylight and screening arrangement is installed. As a consequence, it is possible to install a screening arrangement comprising a set of rails 7, 8, 9, 10 of given lengths in curbs having different internal dimensions within a certain range, without difficult adaptation procedures. For instance, the bottom rail 8 illustrated in FIG. 3 may be installed in a curb of such a small width that a end face 47 of the rail 8 abuts the rib 48 of the corner bracket 24, or in a curb of such a large width that the rail 8 just overlaps the bottom plate 26 of the corner bracket 24. Obviously, if the rib 48 of the corner bracket 24 is omitted, the bottom rail 8 may be installed in a curb of even smaller width.

As to the side rails 9, 10 guiding the tips 17 of the end bar 13 of the pleated blind 12, it is advantageous that these have a greater length at the edge of their second leg 23 where the channel 18 opens, than at the flange 19, because this design ensures that the channel 18 is long enough to guide the end bar 13 all the way to its end positions even when the rail 10 overlaps the corner bracket 24 as little as possible without uncovering the gap between the bottom rail 8 and the side rail 10, and at the same time this design does not limit the shortest possible distance between the two corner brackets between which the side rail 10 can be mounted. This is so because the inclined end face 49 of the side rail 10 cannot abut the rib 48 of the corner bracket 24 in the mounted position of the side rail 10.

After mounting the rails 7, 8, 9, 10, the two cords 15 of the arrangement for parallel displacement of the end bar 13 are attached by their ends to the respective hooks 44 of the two corner brackets 24 at the corners 25 of the curb, as illustrated in FIG. 3.

Figure 7:
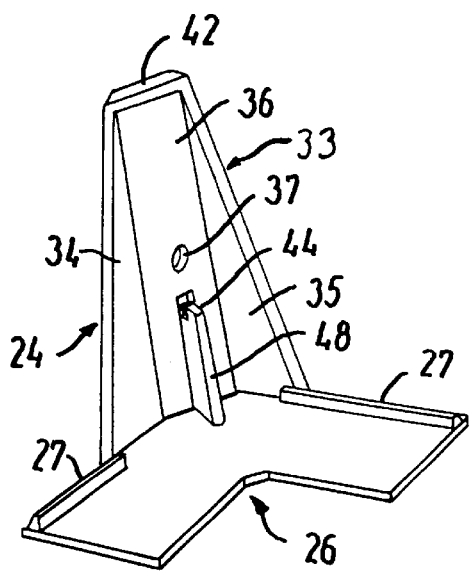
FIG. 7 is a perspective view illustrating an alternative embodiment of the corner bracket in FIG. 5.

FIG. 7 illustrates another embodiment of the corner bracket 24 in which the flap 41 of the corner bracket 24 in FIG. 5 has been omitted so that the top edge 42 of the flange 33 is free. This corner bracket 24 is installed in the same way as the corner bracket 24 in FIG. 5, however, instead of abutting the flap 41 against the top edge 3 of the curb 1, the top edge 42 of the corner bracket 24 is aligned with the top edge of the curb 1. This is done, for instance, by placing a finger or a ruler on the top edge 3 of the curb 1 in such a way that the finger projects perpendicularly from the internal surface 5 of the curb, and subsequently positioning the corner bracket 24 in the corner 25 of the curb so that its top edge 42 abuts the finger. Then the corner bracket 24 is fixed to the curb by means of the screw 38.

Figure 8:
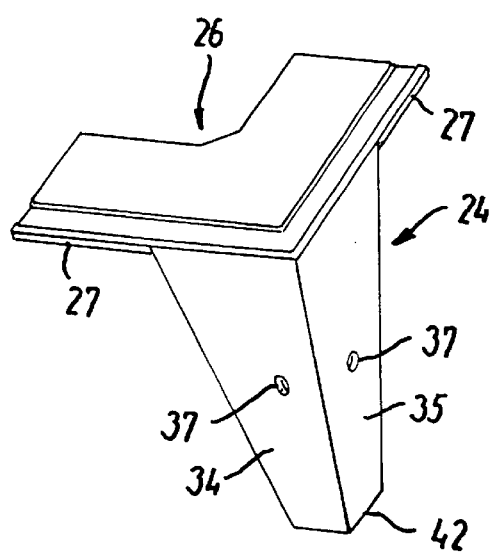
FIG. 8 is a perspective view illustrating an alternative embodiment of the corner bracket in FIG. 5, seen from below.

FIG. 8 illustrates yet another simple embodiment of the corner bracket 24 in which the third wall section 36 of the flange 33 in FIG. 5 is omitted so that the two perpendicular wall sections 34, 35 are joined directly. In this embodiment each of two perpendicular wall sections 34, 35 is provided with a mounting hole 37. One of the wall sections 34, 35 could, however, be omitted, as the positioning of the corner bracket 24 in relation to the internal surface 5 of the curb can follow by abutment of the two perpendicular edges 27 on the internal surface 5 and one of the wall sections 34, 35 is sufficient for alignment of the top edge 42 of the corner bracket 24 with the top edge 3 of the curb and for fixation of the corner bracket 24 to the curb 1 by insertion of the screw 38 in the mounting hole 37.

Several variations of the corner bracket 24 according to the invention are possible without parting from the scope of the claims, for instance, the bottom plate 26 of the corner bracket 24 does not have to be L-shaped but could be triangular. Further, the ribs 31 on the corner bracket 24 and the corresponding notches in the rails 7, 8, 9, 10 could be omitted.

What is claimed is:

1. A screening arrangement for installation in a curb for a skylight in a roof structure, said curb having four wall members forming a substantially rectangular frame having four corners; a top edge; and an internal surface facing the inside of the frame, said screening arrangement comprising:
   (a) four rails being adapted to be mounted on the internal surface of said curb to form a frame in the curb, each of said rails having opposite ends, said rails comprising at least one supporting rail associated with a collapsible screen of which a first end is fixed in relation to said rail and a second end is free; and
   (b) four corner brackets for mounting at respective corners of the curb, each said bracket having an abutment surface adapted to abut the top edge of the curb wherein said bracket is in a mounted position and a support member in the form of a plate member adapted to support two of said rails in an installation position along the internal surface of the curb;
   wherein, in the mounted positions of said corner brackets at respective corners of the curb, each of said rails is movable into said installation position in which a downward facing side of either opposite end of said rail abuts an upward facing side of said plate member of one of said corner brackets.

2. A screening arrangement for installation in a curb for a skylight in a roof structure, said curb having four wall members forming a substantially rectangular frame having four corners; a top edge; and an internal surface facing the inside of the frame, said screening arrangement comprising:
   (a) four rails being adapted to be mounted on the internal surface of said curb to form a frame in the curb, each of said rails having opposite ends, said rails comprising at least one supporting rail associated with a collapsible screen of which a first end is fixed in relation to said rail and a second end is free; and
   (b) four corner brackets for mounting at respective corners of the curb, each said bracket comprising:
      (i) at least one contact surface for abutment against the internal surface of the curb;
      (ii) a mounting hole for insertion of a fastener, such as a screw, a nail or the like;
      (iii) a top edge adapted to be in alignment with the top edge of the curb when said bracket is in a mounted position; and
      (iv) a support member in the form of a plate member adapted to support two of said rails in an installation position along the internal surface of the curb;
   wherein, in the mounted position of said corner brackets at respective corners of the curb, each of said rails is movable into said installation position in which a downward facing side of either opposite end of said rail abuts an upward facing side of said plate member of one of said corner brackets.

3. A screening arrangement as claimed in claim 1, wherein said corner bracket has two contact surfaces which are at right angles to each other and which are intended for abutment against the internal surface of the curb.

4. A screening arrangement as claimed in claim 3, wherein said corner bracket has a mounting hole between its two contact surfaces.

5. A screening arrangement as claimed in claim 4, wherein the mounting hole is arranged in a wall connecting said two contact surfaces, said wall forming an angle of 45° with the contact surfaces, and wherein stiffening ribs are provided on said connecting wall for abutment against the internal surface of the curb.

6. A screening arrangement as claimed in claim 1, wherein said support member is in the form of a plate member adapted to abut a downward surface of said rails.

7. A screening arrangement as claimed in claim 6, wherein said plate member of said corner bracket is shaped to cover a possible gap between said two rails in their mounted position.

8. A screening arrangement as claimed in claim 1, wherein said corner bracket comprises a hook for fastening of a guide cord of said collapsible screen.

9. A screening arrangement as claimed in claim 1, wherein said rails comprise two side rails which are adapted for mounting at right angles to said supporting rail and each of which has opposite end faces which are inclined against each other in a direction toward a mounting face of a long side of said side rail.

10. A corner bracket for use in mounting rails forming a frame of a screening arrangement in a curb for a skylight in a roof structure, said curb having four wall members forming a substantially rectangular frame having four corners; a top edge; and an internal surface facing the inside of the frame, said corner bracket comprising:
    (a) a bottom plate having two edges at right angles to each other and being adapted to abut a downward side of two of said rails;
    (b) a corner flange standing up from the bottom plate and having three wall sections, two of which follow either one of said edges of the bottom plate and are interconnected by the third wall section which forms an angle of 45° with said edges of the bottom plate;
    (c) a mounting hole in said third wall section;
    (d) generally triangular stiffening ribs provided on said third connecting wall and each having two free edges following said edges of the bottom plate; and
    (e) a flap projecting from a top edge of said corner flange and being substantially parallel to said bottom plate.

11. A corner bracket as claimed in claim 10, wherein a hook for attachment of a cord is provided on said third connecting wall.

12. A method for mounting a screening arrangement in a curb for a skylight in a roof structure, said curb having four wall members forming a substantially rectangular frame having four corners; a top edge; and an internal surface facing the inside of the frame, said method comprising the steps of:
    (a) mounting four corner brackets at respective corners of the curb by placing an abutment surface of each corner bracket on the top edge of the curb and securing the brackets to the curb by means of fasteners, such as screws, nails or the like;
    (b) placing each of four rails of the screening arrangement between two respective corner brackets so that either opposite end of each rail is supported by a supporting member of a corner bracket; and
    (c) securing said rails to the internal surface of the curb by means of fasteners, such as screws, nails or the like.

13. A method as claimed in claim 12 comprising the additional step of attaching two guide cords of the screening arrangement to respective hooks provided on said corner brackets.

14. A screening arrangement for installation in a curb for a skylight in a roof structure, said curb having four wall members forming a substantially rectangular frame having four corners; a top edge; and an internal surface facing the inside of the frame, said screening arrangement comprising:

(a) four rails being adapted to be mounted on the internal surface of said curb to form a frame in the curb, said rails comprising at least one supporting rail associated with a collapsible screen of which a first end is fixed in relation to said rail and a second end is free; and (b) four corner brackets for mounting at respective corners of the curb, each said bracket having an abutment surface for abutment on the top edge of the curb and a support member for supporting two of said rails, each bracket member including a bottom plate having two edges at right angles to each other and being adapted to abut a downward side of two of said rails;

a corner flange standing up from the bottom plate and having three wall sections, two of which follow either one of said edges of the bottom plate and are interconnected by the third wall section which forms an angle of 45° with said edges of the bottom plate;

a mounting hole in said third wall section;

generally triangular stiffening ribs provided on said third connecting wall and each having two free edges following said edges of the bottom plate; and a flap projecting from a top edge of said corner flange and being substantially parallel to said bottom plate.

* * * * *

UNITED STATES PATENT AND TRADEMARK OFFICE
CERTIFICATE OF CORRECTION

PATENT NO. : 6,607,020 B1  
DATED : August 19, 2003  
INVENTOR(S) : Jimmy Skjold Jensen and Samuel Howard Darmer It is certified that error appears in the above-identified patent and that said Letters Patent is hereby corrected as shown below:

<u>Title page,</u>
Item [75], Inventors, should read -- Jimmy Skjold Jensen (DK)
                                            Samuel Howard Darmer (US) --.

Signed and Sealed this

First Day of November, 2005

JON W. DUDAS
*Director of the United States Patent and Trademark Office*